United States Patent
Voegele et al.

(10) Patent No.: US 7,979,379 B2
(45) Date of Patent: Jul. 12, 2011

(54) MONITORING A SERVICE ORIENTED ARCHITECTURE

(75) Inventors: Joachim Voegele, Riedstadt (DE); Gerald Ristow, Griesheim (DE)

(73) Assignee: Software AG, Darmstadt (DE)

( * ) Notice: Subject to any disclaimer, the term of this patent is extended or adjusted under 35 U.S.C. 154(b) by 813 days.

(21) Appl. No.: 11/969,642

(22) Filed: Jan. 4, 2008

(65) Prior Publication Data
US 2009/0164407 A1    Jun. 25, 2009

(30) Foreign Application Priority Data

Dec. 21, 2007    (EP) ................................. 07025008

(51) Int. Cl.
*G06F 9/44* (2006.01)
*G06N 7/02* (2006.01)
*G06N 7/06* (2006.01)

(52) U.S. Cl. ........................................................ 706/52
(58) Field of Classification Search ..................... 706/52
See application file for complete search history.

(56) References Cited

U.S. PATENT DOCUMENTS

| | | | |
|---|---|---|---|
| 5,687,290 A | | 11/1997 | Lewis |
| 5,842,157 A * | | 11/1998 | Wehhofer et al. ............. 702/189 |
| 6,282,526 B1 * | | 8/2001 | Ganesh ............................ 706/8 |
| 6,324,550 B1 | | 11/2001 | Huetter |
| 6,477,520 B1 * | | 11/2002 | Malaviya et al. ............... 706/47 |
| 7,526,501 B2 * | | 4/2009 | Albahari et al. ..................... 1/1 |
| 7,647,126 B2 * | | 1/2010 | Blevins et al. .................. 700/49 |
| 7,680,546 B2 * | | 3/2010 | Gilbert et al. ................... 700/17 |
| 7,702,409 B2 * | | 4/2010 | Lucas et al. ..................... 700/96 |
| 7,706,895 B2 * | | 4/2010 | Callaghan ........................ 700/17 |
| 7,729,789 B2 * | | 6/2010 | Blevins et al. .................. 700/83 |
| 7,783,370 B2 * | | 8/2010 | Nixon et al. .................... 700/83 |
| 7,783,468 B2 * | | 8/2010 | Abu el Ata et al. ............. 703/22 |
| 7,860,222 B1 * | | 12/2010 | Sidler et al. ................. 379/32.01 |
| 7,860,968 B2 * | | 12/2010 | Bornhoevd et al. ............ 709/224 |
| 7,881,920 B2 * | | 2/2011 | Abu El Ata et al. ............ 703/22 |
| 7,899,917 B2 * | | 3/2011 | Chitre et al. .................. 709/228 |

(Continued)

FOREIGN PATENT DOCUMENTS
EP    1863258    12/2007

OTHER PUBLICATIONS

Remo: A RGPS-based requirements modeling process for service oriented Architecture, Bo Hu; Keqing He; Peng Liang; Rong Li; Networked Computing and Advanced Information Management (NCM), 2010 Sixth International Conference on Publication Year: 2010, pp. 97-102.*

(Continued)

*Primary Examiner* — Michael Holmes
(74) *Attorney, Agent, or Firm* — Meyertons Hood Kivlin Kowert & Goetzel, P.C.; Jeffrey C. Hood (57) ABSTRACT

Monitoring a service oriented architecture (SOA) comprising a plurality of components. The method may include providing at least one monitoring unit for at least one of the plurality of components. The method may further include providing data concerning an operation of the at least one component as input data to the at least one monitoring unit. Finally, the method may include applying fuzzy logic in the monitoring unit to analyze the input data for generating at least one output value. The at least one output value may then be provided.

30 Claims, 3 Drawing Sheets

U.S. PATENT DOCUMENTS

2006/0031481 A1    2/2006    Patrick et al.

OTHER PUBLICATIONS

Kaser: a qualitatively fuzzy object-oriented inference engine, Rubin, S.H.; Rush, R.J., Jr.; Murthy, J.; Smith, M.H.; Trajkovic, L.; Fuzzy Information Processing Society, 2002. Proceedings. NAFIPS. 2002 Annual Meeting of the North American Digital Object Identifier: 10.1109/NAFIPS.2002.1018085 Publication Year: 2002 , pp. 354-359.*

Discharge summary note based on service-oriented architecture, Chi-Huang Chen; Sung-Huai Hsieh; Po-Hsun Cheng; Yu-Shuan Su; Feipei Lai; Industrial Informatics (INDIN), 2010 8th IEEE International Conference on Digital Object Identifier: 10.1109/INDIN.2010.5549637 Publication Year: 2010 , pp. 813-818.*

QTIP: multi-agent NLP and privacy architecture for information retrieval in usable Web privacy software, Keselj, V.; Jutla, D.; Web Intelligence, 2005. Proceedings. The 2005 IEEE/WIC/ACM International Conference on Digital Object Identifier: 10.1109/WI.2005.124 Publication Year: 2005 , pp. 718-724.*

European search report for application No. EP 07 02 5008, search completed May 7, 2008.

Fazelpour, et al.; "A Fuzzy Management Information Base (FMIB) for Network Management"; WESCAN 1994; Idea/Microelectronics Conference Record; Anaheim, CA, USA; Sep. 27-29, 1994; pp. 342-347.

Lacrose, et al.; "Fusion and Hierarchy Can Help Fuzzy Logic Controller Designs"; Fuzzy Systems; 1997; pp. 1159-1165.

Mendel, Jerry M.; "Fuzzy Logic Systems for Engineering: A Tutorial"; Proceedings of the IEEE; vol. 83, No. 3; Mar. 1995; pp. 345-377.

* cited by examiner

MONITORING A SERVICE ORIENTED ARCHITECTURE

PRIORITY CLAIM

This application claims benefit of priority of European application no. 07 025 008.9 titled "Method and System for monitoring a Service Oriented Architecture", filed Dec. 21, 2007 and whose inventors are Joachim Voegele and Dr. Gerald Ristow.

INCORPORATED BY REFERENCE

European application no. 07 025 008.9 titled "Method and System for monitoring a Service Oriented Architecture", Dec. 21, 2007 and whose inventors are Joachim Voegele and Dr. Gerald Ristow, is hereby incorporated by reference in its entirety as though fully and completely set forth herein.

TECHNICAL FIELD

The present application relates to service oriented architectures (SOAs) and more particularly to a method for monitoring an SOA.

DESCRIPTION OF THE RELATED ART

In an SOA, resources are made available to participants in a network as independent services that the participants can access in a standardized way. Whereas most definitions of an SOA use SOAP requests conveyed via HTTP/HTTPS over TCP/IP, an SOA may use any service-based technology. The services interoperate based on formal definitions which are independent from the underlying platform and programming language. More specifically, the interface definition may encapsulate the specific implementations. An SOA is typically independent of a specific development technology (such as Java and .NET). The software components may be reusable because the interface is standards-compliant and is independent from the underlying implementation of the (web) service logic. For example, a C# (C Sharp) service could be used by a JAVA application and vice versa.

Monitoring an SOA is an important and difficult technical task in order to assure that the SOA operates as desired. This applies not only to the development stage of the SOA, when the source code of the various SOA components repeatedly need to be debugged, but also to the deployment and test phases, for example, when exceptional runtime situations must be controlled or the performance of the SOA is to be evaluated for maintenance or other purposes.

Traditionally, monitoring a software system comprises generating one or more log files according to a set of fixed and predetermined rules of the monitoring system, where the log files allow an administrator to understand the sequence of events as they occurred in the software system. This concept is problematic for application in an SOA, since it only provides a limited amount of flexibility, which is in contrast to the flexible nature of an SOA. Furthermore, log files are not applicable to discover complex error situations in advance. On the contrary, log files only allow for discovering the reason for a problem after the problem has already occurred. Consequently, log files do not enable taking any counter measures in due time to prevent the problem.

Since an SOA landscape usually consists of many components that can interact with each other in a complex way that may dynamically change over time, keeping track of all configurations and the changes thereof is a non-trivial task. It is therefore known in the prior art to provide a centralized registry/repository for an SOA, such as the products "Infravio" or "CentraSite" of applicant, which can simplify and facilitate this task. However, documenting the SOA landscape does not ensure a smooth and error-free operation. In the EP 1 863 258, applicant already described a system and method for managing web services and how runtime information of the SOA can be gathered and stored in this registry. Whereas the disclosed method and system already substantially facilitates the management of the complex SOA landscape, it is not capable to automatically analyze complex situations.

Further monitoring systems known in the prior art are bound to application servers and mostly supervise only web services. An example can be found in US 2006/0031481 A1, which discloses the monitoring of a plurality of service proxies by collecting and aggregating data and triggering events according to rules predefined by a user. Another example for a modeling tool for composite e-services and functionality, which allows monitoring the status of service execution, can be found in U.S. Pat. No. 7,222,334 B2.

In a different technical field, namely the operation of mechanical machines, it is known to involve fuzzy logic for supervising tasks such as the control of bearings for a rotation part. Input signals, such as sensor information concerning the bearing temperature can be processed by means of an adaptive, rule-based fuzzy logic process. An example for such prior art, which is not at all related to software and in particular not related to the management of an SOA, can be found in the U.S. Pat. No. 5,842,157.

In view of the above, improved methods for monitoring an SOA are desired.

SUMMARY OF THE INVENTION

Various embodiments are presented of a method for monitoring a service oriented architecture (SOA). The method may include providing at least one monitoring unit for at least one of the plurality of components. The method may further include providing data concerning an operation of the at least one component as input data to the at least one monitoring unit. Finally, the method may include applying fuzzy logic in the monitoring unit to analyse the input data for generating at least one output value.

In contrast to the prior art mentioned above, the monitoring method may not only collect input data in a log file but may further analyze the input data using an intelligent approach such as fuzzy logic. Applying fuzzy logic simplifies the formulation of rules, since simple linguistic formulations can be employed. Using at least one monitoring unit which analyses its input data applying fuzzy logic or other intelligent analyzing methods and outputting at least one output value in a sort of "black box" manner allows the method to be applied to all different types of components of a SOA, such as, for example, services, especially web services, applications, clients, e.g., any kind of hardware and software components of the SOA.

In one embodiment, the monitoring unit or method may comprise a statistics unit for providing statistical information on the input data. The additional information on the input data may help to classify the input data and later in the monitoring process to derive conclusions based on the classification. Further the provided information can be calculated or derived based on current input values, on values gathered in a test run of the system or in a separate system. The statistical information can comprise values such as, e.g. average, minimum, maximum, standard deviation, etc.

The statistics unit may further receive a selector signal for selecting one of a plurality of modes of operation of the statistics unit. This feature may keep the monitoring method flexible, since the statistical information provided by the statistics unit can be influenced in the way it is determined, e.g., by selecting a certain time window for the calculation of statistic values or by limiting the number of values considered for one statistic value or other possible restrictions or rules. Furthermore, the statistical information can be recalculated and consequently may follow a change of the input data during operation of the SOA.

According to a further aspect, the input data may be compared to a response curve. The response curve may be generated by a response curve generator using statistical information, e.g., provided by the statistics unit. Using a response curve based on statistical values for comparison may provide more accurate results since the statistical information is based on the related input data. Since the statistical information can follow changes of the input data during operation, automatically generated response curves based on this information may keep the monitoring method flexible.

Further, the generated response curve may be used for applying the fuzzy logic in the method, wherein the monitoring unit may output to what percentage the input data falls into, e.g., any of the categories high, medium and low or a value indicating that the input data is currently not available. Such output values may be advantageous if there is no sharp limit for distinguishing between different situations. These values may help to follow rules with contain phases as "a bit", "approximately", etc., which without fuzzy logic cannot be understood by a technical method or system.

In one embodiment, the at least one output value may be provided with a timestamp in order to facilitate the later monitoring process and referencing.

In a further embodiment, the at least one output value of a monitoring unit may be provided as input data into a further monitoring unit. The further monitoring unit may receive at least two output values of at least two monitoring units as input data. In other words, an overall monitoring process may be built up in a modular and hierarchical fashion by combining the partial monitoring processes performed by the monitoring units. Since the monitoring units may show "black box" behaviour and thus act as standard elements, building a hierarchy of monitoring units for different types of components may be significantly simplified. Such a hierarchy may provide useful output values even for complex monitoring processes by combining the condition information of each component monitored by at least one monitoring unit in order to obtain a global statement. The further monitoring unit may be preferably a rule based monitoring unit and preferably outputs a warning message, if a threshold is exceeded.

The method described above may be implemented in software (e.g., as program instructions on computer-accessible memory mediums which are executable by a processor) or in various computing systems. In one embodiment the computing system may include at least one monitoring unit for at least one of the plurality of components, wherein the at least one monitoring unit is adapted to receive data concerning an operation of the at least one component as input data, and wherein the at least one monitoring unit is further adapted to apply fuzzy logic to analyse the input data for generating at least one output value.

In a one embodiment, the monitoring system may be part of a registry/repository of the SOA. As a result, the SOA may comprise a central point for monitoring at least a part of the SOA and allows easy access to all necessary information for fulfilling the monitoring task. This may facilitate the work of an administrator supervising the warnings output by the system for monitoring the SOA, or the work of a developer including further components in the overall monitoring process.

Further modifications of the system are envisioned.

SHORT DESCRIPTION OF THE DRAWINGS

In the following detailed description presently preferred embodiments of the invention are further described with reference to the following figures.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Various embodiments are presented of a system and method for a monitoring process for an SOA which detects and classifies damage or malfunction by pattern recognition. This monitoring process can be set up to be self learning and/or rule based. The whole monitoring process may be built up in a modular and hierarchical fashion and uses fuzzy logic to simplify the formulation of rules in order to obtain overall monitoring statements.

Figure 1:
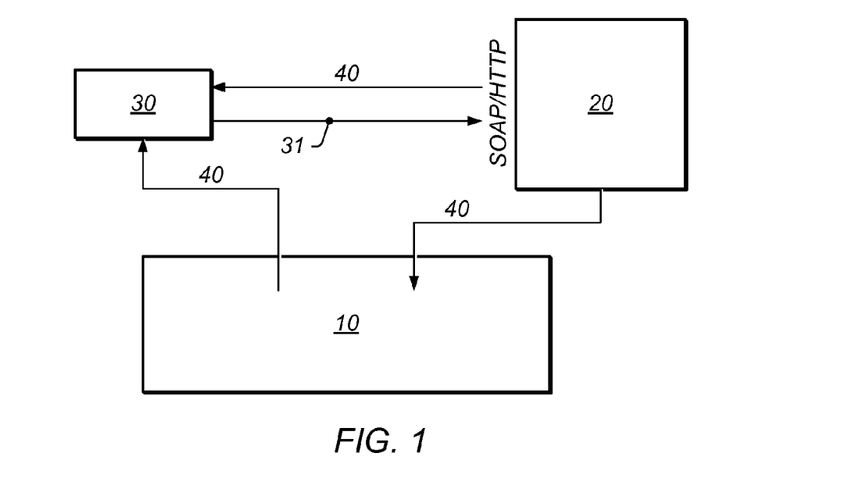
FIG. 1: A general overview of an example of a simplified SOA comprising an application calling a Web Service and a registry with a description of the Web Service, according to one embodiment.

FIG. 1

In this context, FIG. 1 presents an overview of an extremely simplified SOA, the operation of which could be monitored by the monitoring system explained below:

An application 30 or client 30 may issue a request 31 for a web service 20. To this end, the application 30 or client 30 may need at first a description about the interface definitions of the web service 20. This description 40, which may for example be provided in the Web Service Definition Language (WSDL), can either be obtained directly from the web service 20 or from a registry/repository 10 (cf. FIG. 1). It is apparent that a SOA can comprise more than one application/client and more than one web service as well as any other type of component.

The registry/repository 10 may include descriptions of all web services of the SOA, for example WSDL files 40 with information about the function, the data, the data type and the exchange protocols of the respective web service. Therefore, if the application 30 or client 30 intends to send a request to the web service 20, it can obtain the WSDL file 40 from the registry 10 to find out how to access the web service 20. However, it is to be understood that the present invention is not limited to the simplified SOA of FIG. 1 but can be used with any kind of SOA.

In other words, an SOA landscape may usually consist of many components that can interact with each other in a complex way. Such components of an SOA can be of very different origin including objects such as services, especially web services, applications, clients, hardware and software components, and many more. In order to get an overview of the actual SOA landscape, at least one of these components can be registered in an SOA registry like Infravio or CentraSite, provided by applicant, using for example UDDI or JAXR. The components can either register themselves automatically at installation, configuration or start-up time, or may be registered either manually or through a so-called harvest process which searches for components in well-known places, e.g., application servers.

Accordingly, the SOA registry may store information about the SOA infrastructure and their interdependencies. This may already allow for impact analysis, e.g., which applications/clients are affected if a service changes or is retired and therefore needs to be adopted, or which services are affected if an application server or computer is going down for maintenance so that the users have to be informed or the service needs to be transferred to another application server or computer. However, the described procedure may not give information about the actual performance or condition of the SOA landscape.

For this purpose, it may be necessary to collect runtime data from at least one of the individual components of the SOA and/or to monitor it/them. Combining the information about components of the SOA landscape obtained from one or more monitoring units may provide an overall picture on how well the SOA landscape formed by the monitored components is operating. This can become a huge and complex task even for simple landscapes. The presented embodiments provide a solution on how the complexity can be reduced and the data be combined in a smart way to obtain rule-based monitoring statements. Various embodiments of the individual monitoring process on at least a single component of the SOA are described below:

By registering a SOA component in a SOA registry or by storing information on the SOA component in the SOA registry, at least a part of the complete SOA landscape may be modelled in the registry. The proposed process for a detailed and in-depth monitoring of the SOA landscape may begin from this information available in the registry. As a result, at least one component of the SOA landscape in the SOA registry which is intended to be monitored, may be duplicated by at least one monitoring unit.

In some embodiments, the one or more monitoring unit(s) may be stored in the registry of the SOA. However, it is also possible to keep the monitoring unit and/or related information separate from the registry of the SOA. According to one embodiment, it is possible to have one monitoring unit for monitoring one component of the SOA and/or to have one monitoring unit for monitoring more than one of the plurality of components of the SOA. It is further possible to monitor only one component of the SOA, to monitor more than one, or to monitor all components, as desired.

Figure 2:
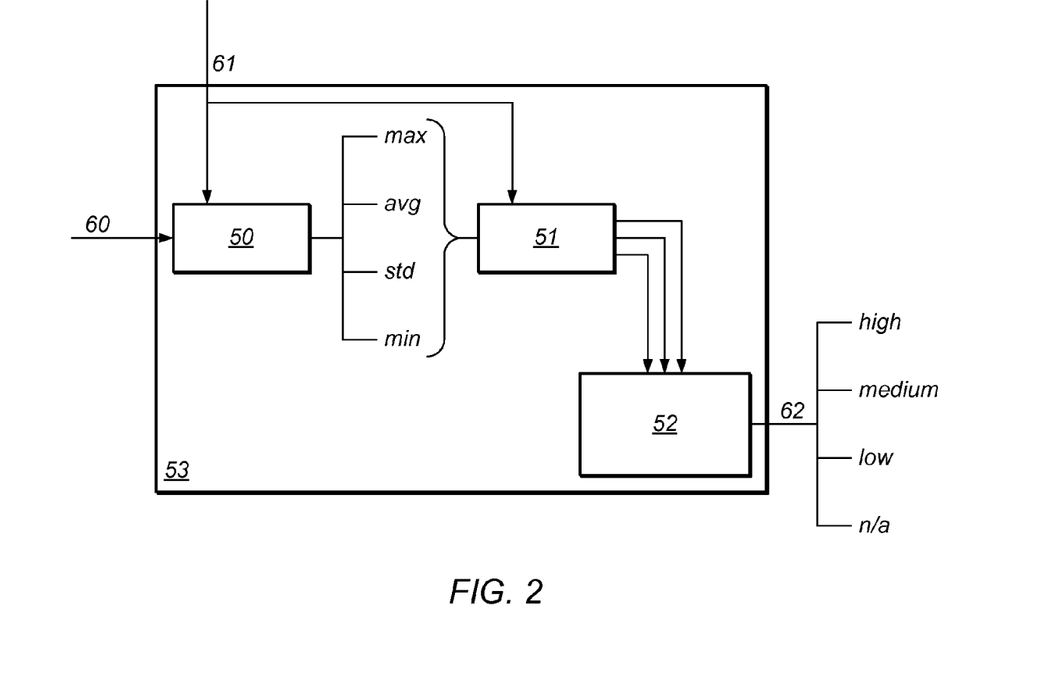
FIG. 2: Details of an example of an individual monitoring process, according to one embodiment.

In one embodiment, the monitoring unit 53 shown in FIG. 2 for a single SOA component may include the exemplary units 50, 51, 52. However, it is also possible that some of the units are combined or that one or more of the units are situated outside the monitoring unit M1a.

Data collected at the actual component being monitored, or data related to this component, which may be retrieved from the registry 10, may be used as input data 60 for the monitoring process. The input data can for example comprise actually measured values of the bandwidth, the message length, the number of messages per time, the duration or any other suitable value related to an operation of the monitored component. If the monitored component is not a web service but for example a hardware component of the SOA, different values which are specific to this component can be used as input data 60. The input data 60 may be simultaneously fed into or provided to the statistics unit 50 and the classification unit 52.

The statistics unit 50 may provide statistical information on the input data by calculating the average value, the minimal and maximal values, the standard deviation or other suitable values of the input data respectively the input signal. It is further possible for the statistics unit 50 to retrieve these values from the repository 10 or any other source.

In some embodiments, it may depend on the selector setting 61 provided by a selector, when and how the above mentioned statistical information or statistic values are calculated or recalculated. The selector may choose between different modes of operation, may define a time window and/or may limit the number of data values per possible value or in total and/or applies any other reasonable rule or restriction. Further, the selector may include a manual mode to allow for individual operation. The selector may feed the above as a selector setting 61 into the unit 51.

In the embodiment of FIG. 2, the unit 51 may be a response curve generator. The response curve generator 51 may receive the selector setting 61 and the statistical information/values provided or calculated by the statistics unit 50. The response curve generator 51 may further use at least a part of the received information to determine a response curve, preferably a fuzzy logic response curve. In another embodiment, the response curve generator 51 does not receive a selector setting 61 or statistical information from the statistics unit 50 but receives a complete response curve or instructions allowing the generation of a response curve from a different source. Regardless of its origin, the response curve is used in the classification unit 52, which may be a fuzzy logic classification unit 52.

The classification unit 52 may use the response curve provided by the response curve generator 51 and/or may also take into account possible absolute boundary values in order to determine the at least one output value 62. The output values 62 may express to what percentage the data input given to the classification unit 52 falls into the categories high, medium and low. Further, a value of "not available", noted as "n/a" in FIG. 2 and FIG. 3, may be preferably also possible and will be handled by following units. This value of "not available" can be delivered in a separate fashion, e.g. as part of a vector, or the numerical value can indicate this special value which is then given for the low, medium and high channels simultaneously. In a further embodiment, at least one output value 62, possibly each output value 62, can also be provided with a timestamp in order to facilitate the later monitoring process and referencing.

FIGS. 3-6

FIGS. 3 to 6 illustrate exemplary details of the generation of the response curves in the response curve generator 51 and their application in the classification unit 52. In one embodiment, the response curves used in the classification unit 52 may be generated by the response curve generator using the values collected, provided and/or calculated by the statistics unit 50. In the embodiment according to FIGS. 3 to 6, the output signal of the response curves may be normalized to values between 0 and 100, indicating a percentage. However, other output values or mappings are possible according to other embodiments.

Figure 3:
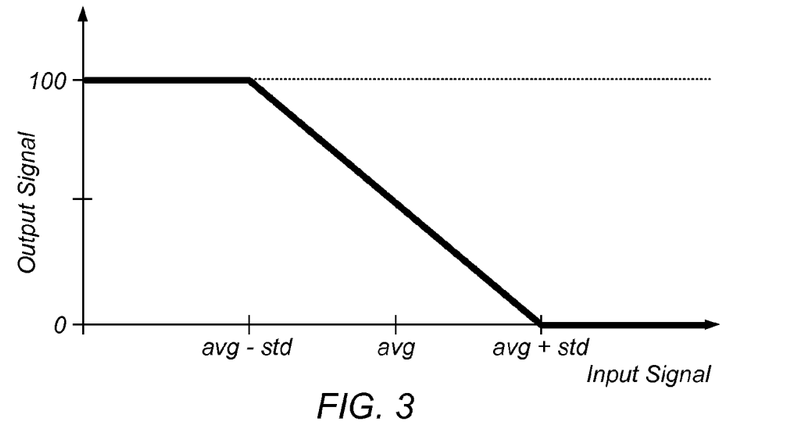
FIG. 3: An exemplary response curve for "low value, according to one embodiment.

An example for a response curve giving the amount of a "low value" in the input data/signal is shown in FIG. 3. As shown, the curve may include three linear sections which intersect at the values "average−standard deviation" and "average+standard deviation". If the input data respectively input value is equivalent to the average value, this sample response curve returns a value of 50% "low value". In further embodiments, the response curve could also be a non-linear or piecewise linear or even a non-linear function. The intersection points can also vary, e.g. taking into account the maximum or minimum value or desired low and high values from a theoretical analysis or other given values. The response curve generator 51 may contain source code or rules and/or all further necessary information for generating the response curves. An example code snippet for finding the right-most intersection point for such a set-up can be:

```
IP_R = AVR + STD    /* right-most intersection point set to AVG +
STD by default */
```

-continued

```
If (IP_R < MAX + 0.25*STD) THEN
    IP_R = MAX + 0.25*STD /* new value assigned to intersection
point */
ENDIF
```

Figure 4:
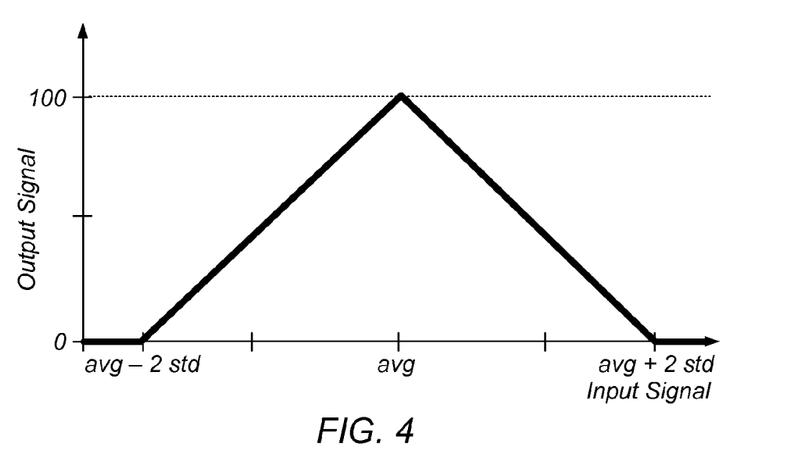
FIG. 4: An exemplary response curve for "medium value" with a sharp peak, according to one embodiment.
Figure 5:
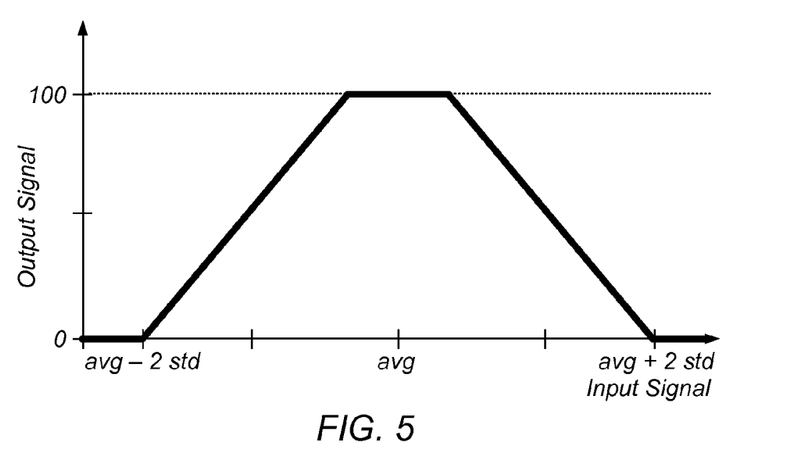
FIG. 5: An exemplary response curve for "medium value" with a plateau, according to one embodiment.

FIG. 4 and FIG. 5 show sample response curves for the amount of a "medium value". The first curve shows a sharp peak around the average value and the latter a plateau but the exact form of the response curve may of course vary from use case to use case. The presented sample curves include linear sections although other response curves are also possible. If the input data/signal has the average value, the amount of "medium value" is returned as being 100% for both sample response curves.

Figure 6:
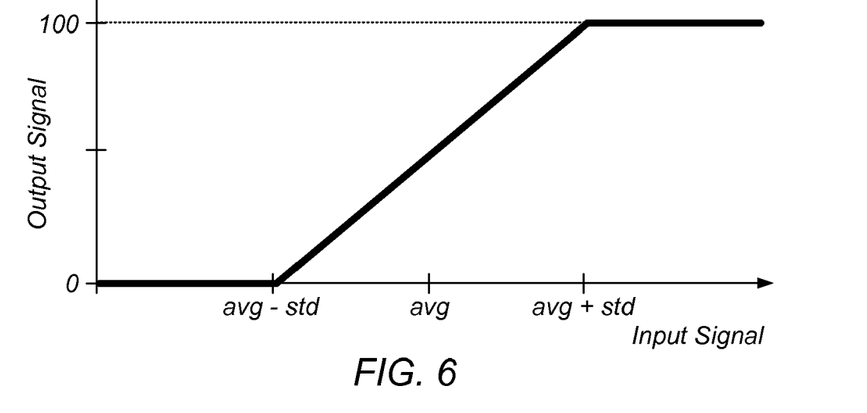
FIG. 6: An exemplary response curve for "high value, according to one embodiment.

FIG. 6 shows a sample response curve for the amount of "high value" in the input data/signal. As can be seen, an input data value with the average value results in a response of 50%.

In some embodiments, the intersection points of the linear sections or of non-linear or partially non-linear sections may be determined during a self-learning phase of the statistics unit 50. The resulting curves can be asymmetric or non-linear which would result in an output signal unequal to 50% in the example of FIG. 6.

The details of the evaluation and/or analysing process performed by the monitoring unit can be hidden in normal operation mode once the parameters, e.g., how the response curve should look like given the values from the statistics unit 50, are all defined. For each kind of input data, only the selector may need to be set so that it can provide a corresponding selector setting 61 and then the percentage of the data input that falls into the categories high, medium and low or if it is currently not available may be determined. This is noted as a "black box" behaviour which is illustrated by the box 53 hiding the units 50, 51, 52 of FIG. 2 and only showing the signals 60, 61 and 62. This black box behaviour may significantly simplify the generation of an overall monitoring process since a hierarchy of standard elements can now be used.

Figure 7:
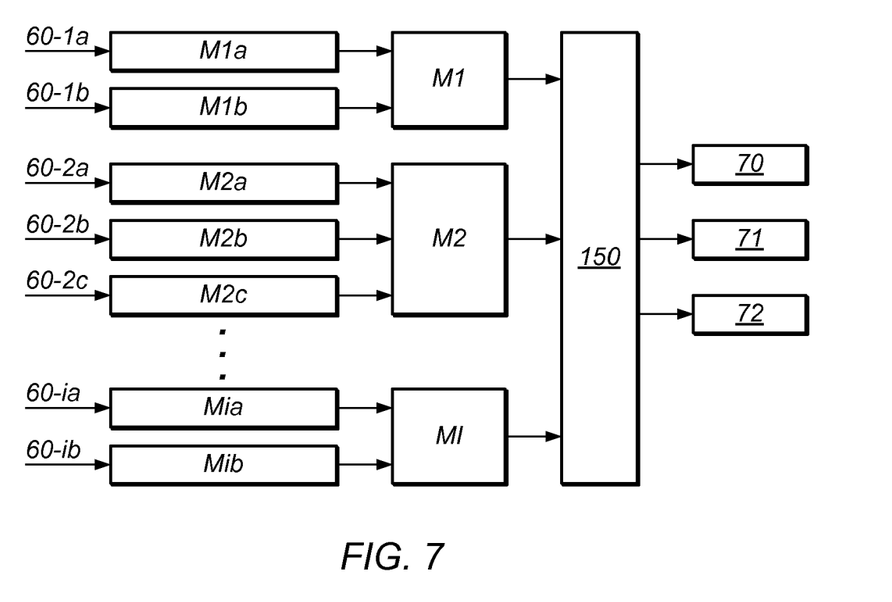
FIG. 7: An example of the combination of individual monitoring units to a global monitoring system in a hierarchical manner, according to one embodiment.

In the embodiment illustrated in FIG. 7, a hierarchy of monitoring units can be built in order to realize more complex monitoring processes based on the combination of monitoring results of single monitoring units of the SOA. To this end, one or more of the output values of the monitoring unit M1a . . . Mia may be input into a further monitoring unit M1, M2, M3, which may in addition receive the output value(s) of one or more other monitoring unit M1b . . . M1b as input data. The combination of the individual monitoring processes may lead to an overall monitoring process allowing for a well-founded statement about the condition of the SOA landscape, e.g. the quality of the actual performance. It is to be noted that building a hierarchy of monitoring units as shown in FIG. 7 is not restricted to monitoring units which apply fuzzy logic.

Looking more in detail at FIG. 7, two data inputs 60-1a, 60-1b for a SOA component 1 may be individually monitored and evaluated and then combined in the monitoring unit M1 to reflect the state of component 1. For component 2, three input values 60-2a, 60-2b, 60-2c may be individually monitored and combined in a similar fashion in monitoring unit M2. Accordingly, different monitoring units can have different amounts of input data/signals. All output values of the last but one level of the monitoring hierarchy may be then combined in a rule based global monitoring unit 150 providing final result values. If a predefined threshold is exceeded by one or more of the final result values, the rule based global monitoring unit 150 may output a warning message and/or an error message and/or an alarm.

In a further embodiment, the hierarchy consists of an arbitrary number of hierarchy levels. Further, there may be a direct link from a lower monitoring level to a higher monitoring level. For example, the output of the individual monitoring unit M1*a* may be directly fed into the global monitoring unit 150, if this output is of particular significance.

Based on the warning message or the like provided by the global monitoring unit 150, an error message can be logged and/or an alarm can be sent out after the intervention of a responsible person, who assesses the severity of the current findings, e.g., the warning message. As a consequence, possible counter measures may be triggered in order to get the SOA landscape back into normal operation mode. The described two-step approach may assure that further actions, which can result in non-trivial consequences, are taken only after human approval. Alternatively, however, the described monitoring system may automatically initiate counter measures.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for monitoring a service oriented architecture (SOA), comprising a plurality of components, wherein the SOA provides a set of loosely-coupled independent distributed services which communicate and interoperate via agreed upon standards, the method comprising:
utilizing a computer to perform:
providing at least one monitoring unit for at least one of the plurality of components of the SOA;
providing data concerning operation of the at least one component as input data to the at least one monitoring unit; and
applying fuzzy logic in the monitoring unit to analyse the input data for generating at least one output value;
providing the at least one output value, wherein the at least one output value is based on said applying.

2. The method of claim 1, wherein said applying comprises a statistics unit of the monitoring unit providing statistical information on the input data.

3. The method of claim 2, wherein the statistical information comprises at least one of the following values with respect to the input data: average, minimum, maximum, or standard deviation.

4. The method of claim 2, wherein the method further comprises receiving a selector signal for selecting one of a plurality of modes of operation of the statistics unit.

5. The method of claim 1, wherein the input data are compared to a response curve.

6. The method of claim 5, further comprising:
generating the response curve using statistical information.

7. The method of claim 5, wherein said applying comprises using the response curve.

8. The method of claim 1, wherein the output value indicates to what percentage the input data falls into any of the categories high, medium and low or a value indicating that the input data is currently not available.

9. The method of claim 1, wherein said providing comprises providing the at least one output value with a timestamp.

10. The method of any claim 1, further comprising:
providing the at least one output value as input data into a further monitoring unit.

11. The method of claim 10, wherein the input data into the further monitoring unit comprises at least two output values of at least two monitoring units.

12. The method of claim 11, wherein the further monitoring unit is a rule based monitoring unit.

13. The method of claim 12, further comprising the further monitoring unit outputting a warning message if a threshold is exceeded.

14. The method of claim 1, further comprising outputting a warning message if a threshold is exceeded.

15. A non-transitory computer-accessible memory medium comprising program instructions for monitoring a service oriented architecture (SOA), wherein the SOA comprises a plurality of components, wherein the SOA provides a set of loosely-coupled independent distributed services which communicate and interoperate via agreed upon standards, wherein the program instructions are executable to implement:
at least one monitoring unit for at least one of the plurality of components of the SOA, wherein the at least one monitoring unit is adapted to:
receive data concerning an operation of the at least one component as input data;
apply fuzzy logic to analyse the input data for generating at least one output value; and
provide the at least one output value, wherein the at least one output value is based on said applying.

16. The non-transitory computer-accessible memory medium of claim 15, wherein the monitoring unit comprises a statistics unit adapted to provide statistical information on the input data.

17. The non-transitory computer-accessible memory medium of claim 16, wherein the statistical information provided by the statistics unit comprises at least one of the following values with respect to the input data: average, minimum, maximum, or standard deviation.

18. The non-transitory computer-accessible memory medium of claim 16, wherein the statistics unit is adapted to receive a selector signal for selecting one of a plurality of modes of operation of the statistics unit.

19. The non-transitory computer-accessible memory medium of claim 15, wherein the program instructions are further executable to implement a classification unit adapted to compare the input data to a response curve.

20. The non-transitory computer-accessible memory medium of claim 19, wherein the program instructions are further executable to implement a response curve generator adapted to generate the response curve using statistical information provided by a statistics unit.

21. The non-transitory computer-accessible memory medium of claim 19, wherein said applying comprises using the response curve.

22. The non-transitory computer-accessible memory medium of claim 15, wherein the output value indicates to what percentage the input data falls into any of the categories high, medium and low or a value indicating that the input data is currently not available.

23. The non-transitory computer-accessible memory medium of claim 15, wherein at least one output value is provided with a timestamp.

24. The non-transitory computer-accessible memory medium of claim 15, wherein the program instructions are further executable to implement a further monitoring unit adapted to receive the at least one output value as input data.

25. The non-transitory computer-accessible memory medium of claim 24, wherein the further monitoring unit is adapted to receive at least two output values of at least two monitoring units as input data.

26. The non-transitory computer-accessible memory medium of claim 25, wherein the further monitoring unit is a rule based monitoring unit.

27. The non-transitory computer-accessible memory medium of claim 26, wherein the further monitoring unit is adapted to output a warning message if a threshold is exceeded.

28. The non-transitory computer-accessible memory medium of claim 15, wherein the monitoring unit is adapted to output a warning message if a threshold is exceeded.

29. The non-transitory computer-accessible memory medium of claim 15, wherein the monitoring unit is part of a registry of the SOA.

30. A non-transitory computer-accessible memory medium comprising program instructions for monitoring a service oriented architecture (SOA), wherein the SOA provides a set of loosely-coupled independent distributed services which communicate and interoperate via agreed upon standards, wherein the program instructions are executable by a processor to:
receive input data concerning operation of the at least one component of the SOA; and
apply fuzzy logic to analyse the input data for generating at least one output value;
providing the at least one output value, wherein the at least one output value is based on said applying.

* * * * *